Sept. 17, 1935.  J. H. CONNOR ET AL  2,014,470
MACHINE AND METHOD FOR USE IN STRETCHING AND SOFTENING LEATHER
Filed May 12, 1932  2 Sheets-Sheet 2
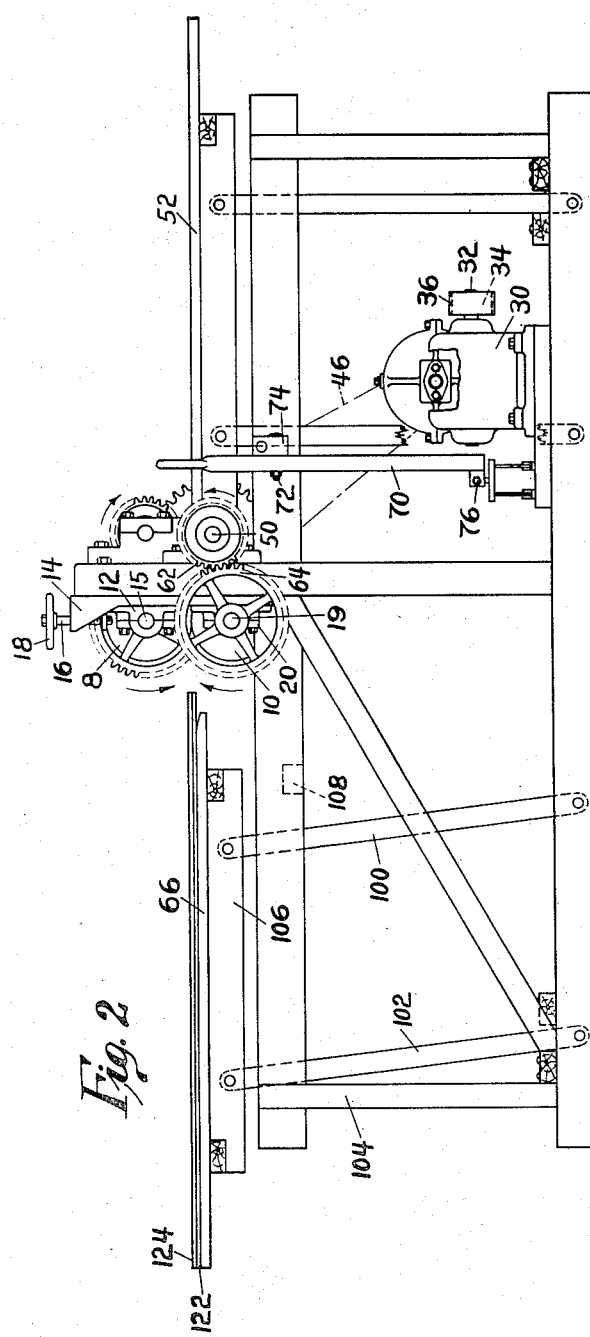
Inventors
John H. Connor
Matthew M. Merritt
By their Attorney
Harlow M. Davis Patented Sept. 17, 1935

2,014,470

UNITED STATES PATENT OFFICE 2,014,470

MACHINE AND METHOD FOR USE IN STRETCHING AND SOFTENING LEATHER

John H. Connor, Newton, and Matthew M. Merritt, Middleton, Mass., assignors to The Tanning Process Company, Boston, Mass., a corporation of Massachusetts Application May 12, 1932, Serial No. 610,918

12 Claims. (Cl. 149—20)

This invention relates to treatment of hides, skins, leather and other similar pieces of work and more particularly to treatment designed to secure stretching and/or softening effects on such pieces of work. It is to be understood, however, that the invention and various important features and characteristics thereof may have other applications and uses.

It is an object of the invention to stretch and/or soften pieces of work, such as leather from hides or skins, while at the same time obviating or greatly minimizing the possibility of damage to the work and particularly to the surfaces of hides or skins approaching the final stage of finished pieces of leather. It is a further object of the invention to provide an improved means and method of general utility in the softening and/or stretching of pieces of work.

To these ends, and in accordance with an important characteristic of the invention, pieces of work in need of stretching and/or softening to improve the quality thereof are subjected to stretching in highly localized areas, the stretching being performed in a succession of areas until all portions of a piece of work have been treated. To secure the best results the piece of work is subjected to stretching operations in a succession of highly localized areas which overlap, thus insuring that no part of the work escapes the stretching and/or softening operations. Conveniently the stretching and/or softening operations are secured, without the direct application of a tool to the work, by compressing a piece of resilient material with a friction surface thereof in contact with the work and displacing the resilient material in opposite directions in the plane thereof at and from the place of pressure, thereby stretching the piece of work in opposite directions from the place of pressure due to the frictional drag of the friction surface on the piece of work. In order to facilitate the operation of stretching and/or softening pieces of work, the latter is placed between pieces of resilient material each having a friction surface in contact with the piece of work and then the resilient material is displaced in opposite directions, each in its own plane, through the application of pressure upon the assembled piece of work and pieces of resilient material, along a relatively narrow area extending clear across the work piece. As a result of the displacement of the resilient material in opposite directions from the seat of pressure and because of the frictional drag of the displaceable resilient material on both sides of the piece of work, the piece of work is stretched in opposite directions and at right angles to the line of pressure.

As illustrated, a piece of leather is placed upon a sheet of material having a layer of resilient rubber material on its upper surface and a second sheet of material having a similar resilient layer is disposed with such layer in contact with the piece of leather, and the assembled piece of leather and sheets of material are then compressed locally in such manner as to cause the resilient rubber material to flow in opposite directions from the seat of pressure, thereby dragging the leather in opposite directions from the seat of pressure whereby it is stretched and softened at a minimum risk of damage to the piece of leather or to its more or less finished surface. This stretching operation is performed in many closely adjacent localized areas. Conveniently, the pressure is applied in a progressively continuous manner from one end to the other of the piece of leather assembled with the described sheets comprising resilient material. Thus, the pressure may be regarded as applied successively in highly localized overlapping areas as the seat of pressure travels along the assembled work pieces from one end of the piece of leather to the other.

The method may be practised by a machine which comprises a work supporting member, a member arranged to contact from above with a piece of work on the supporting member, one or both of said members including a layer of resilient material in contact with the work, and means for exerting pressure upon the piece of work through the resilient material, expansion of the resilient material in its own plane due to the pressure applied being operative to cause stretching and/or softening of the piece of work in contact with the expanding resilient material. Preferably to expedite the operation of stretching and/or softening pieces of work, both the upper and lower work contacting members are provided with a layer of resilient material to contact with a piece of work placed between them so that, upon compression being locally applied to the said members, the resilient material is displaced laterally on both sides of the piece of work at the seat of pressure whereby the piece of work is gripped upon opposite sides at the seat of pressure and stretched and otherwise worked in opposite directions. It follows that the stretching and/or softening effect is greater and more certainly accomplished when the piece of work is acted upon on opposite sides thereof simultaneously. As illustrated, the lower work supporting member has a layer of resilient rubber material on its upper surface upon which the piece of work is placed and the upper member has a layer of resilient rubber material for contacting with the upper surface of the piece of work placed upon the lower member, a pair of rolls being provided for exerting substantial pressure upon the assembled piece of work and layered members during relative movement of said piece of work and members with respect to the rolls during which the rolls exert pressure upon the work in a succession of highly localized overlapping areas from one end of the piece of work to the other.

These and other important features and characteristics of the invention will now be described in detail in the specification and then pointed out more particularly in the appended claims.

In the drawings,

Fig. 2 is a view in side elevation of the machine shown in Fig. 1;

Figure 1:
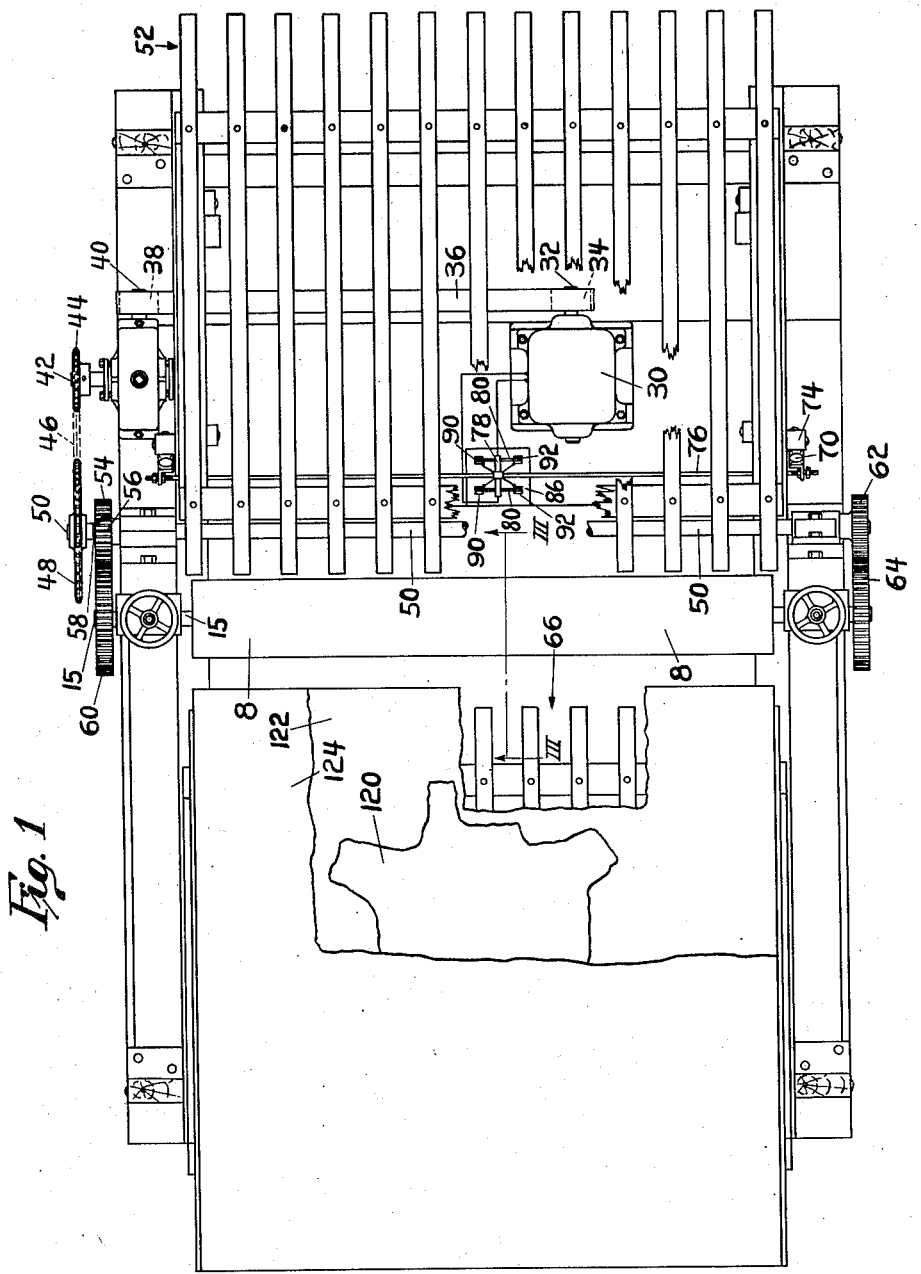
Fig. 1 is a plan view from above, with parts broken away, showing a machine embodying one form of the invention.

Figs. 3 and 4 sectional views to indicate movement of the work supports with respect to the work treating rolls of the machine;

Fig. 5 is a more or less diagrammatic showing of the mode of operation of the rolls upon the work; and Fig. 6 is a sectional view indicating mats or sheets of rubberized fabric with rubber layers on both sides of the fabric.

In the illustrated machine, which is designed more particularly for softening and/or stretching operations upon pieces of leather, there is provided a pair of work treating rolls 8 and 10. The upper roll 8 is conveniently supported at its ends in blocks, one of which is shown at 12 in Fig. 2 slidably carried by a frame member 14, part of the frame structure of the machine. It will be understood that each block 12 carries a journal bearing for the corresponding end of shaft 15 of the roll 8. For rigidly holding the roll 8 at its ends against upward movement there is provided a screw threaded member 16, rotatable in the head portion of the frame member 14, and adapted to engage rotatably the upper end of the block 12. Upon proper manipulation of the screw threaded member 16 through a hand wheel 18 thereon, adjustment of the blocks 12 is permitted to accommodate pieces of work of different thicknesses. Ordinarily, and as shown in the drawings, the lower roll 10 is journaled at its reduced ends 19 in blocks, one of which is shown at 20 in Fig. 2 as fixedly carried by the frame member 14. On machines intended for treatment of relatively heavy pieces of work the rolls 8 and 10, although of solid metal construction, are subject to such bending stresses as to be liable to displacement or bending in the middle portion thereof. Hence, to insure substantially equal pressure upon all portions of the work transversely of the machine, each of the rolls 8 and 10 is conveniently made of a slightly larger diameter in its middle section, tapering gradually toward each end of the roll. This "crowning" of the rolls 8 and 10 does not exceed one-sixteenth of an inch in the illustrated machine, the rolls of which are ten inches in diameter and four feet in length. While in the construction preferred for general use the rolls are ten inches in diameter, it is to be understood that for certain classes of work the rolls may be even larger, and that for certain other work the rolls may be only one inch in diameter in which case they are properly supported against buckling under pressure.

While any well-known arrangement may be utilized for driving the rolls 8 and 10, there is conveniently employed, in the illustrated machine, an electric motor 30 having an armature shaft 32 (Figs. 1 and 2) provided with a pulley 34 around which passes a belt 36 engaged at its other end with a pulley 38 (Fig. 2) on a shaft 40, to which is fixed a beveled gear (not shown) in mesh with a second bevel gear (not shown) on a stub shaft 42 which carries a sprocket wheel 44. Passing around the sprocket 44 is a chain 46, indicated by dotted lines in Figs. 1 and 2, which also engages with a sprocket 48 (Fig. 1) on a shaft 50 mounted in the machine frame below the level of a work supporting table 52. Secured to the shaft 50 is a gear 54 in mesh with a gear 56 on a stub shaft 58 mounted in a journal box rigid with the frame of the machine. As most clearly shown in Fig. 1, the gear 56 is in mesh with gear 60 fixedly secured to the shaft 15 of the upper roll 8. At its other end the shaft 50 carries a gear 62 arranged in mesh with a gear 64 on the adjacent end of the shaft 19 of the lower roll 10. It will be clear that the rolls 8 and 10 are driven in opposite directions and that their adjacent surfaces travel in the same direction to feed a piece of work presented to the rolls by the table 52, or alternatively, by a table 66.

Preferably, and as shown, the rolls 8 and 10 may be driven selectively to feed the piece of work in either direction. While this may be accomplished in any one of several ways, it is preferred to utilize the electric motor 30 so constructed that its polarity may be changed at will. In the illustrated machine, this is accomplished by providing a hand lever 70 (Figs. 1 and 2) pivoted at 72 upon a block 74 secured to the frame of the machine. Connected to the lower end of the hand lever 70 is a rod 76 having its other end pivotally connected to a cross bar 78 connected to bars 80 of a pair of knife switches pivotally mounted on a post secured to a base plate 86 at a point in a plane passing vertically through the cross bar 78, the arrangement being such that, on moving the upper end of the lever 70 in a direction away from the table 52, knife switches 80 are shifted to engage with knife sockets 90 whereby the motor 30 operates to feed the work from right to left in Figs. 1 and 2. If the hand lever 70 be moved at its upper end in a direction toward the table 52, the knife switches 80 engage sockets 92 whereby the polarity of the motor is reversed and the rolls 8 and 10 are rotated in the direction of the arrows in Fig. 2 to cause feeding of the work from left to right in said figure.

While a table structure for supporting pieces of work might be arranged in rigid relation with respect to the framework of the machine, it is preferred to utilize the pair of tables 52, 66 one on each side of the pair of rolls 8 and 10, and each movable to present the work to and remove it from the vicinity of the rolls 8 and 10. Since both tables are mounted in a similar manner a description of one will suffice for both. Upon reference to Fig. 2, it will be observed that table 66 is pivotally carried at the upper ends of two links 100, 102 which are in turn pivoted at their lower ends to the framework of the machine. It will be understood that the links 100, 102 are in pairs, one pair at each side of the table 66. Conveniently, and as shown, the links 102 are arranged to contact with upright frame posts 104, at the upper end of the latter, which serve as stops to the movement of the links 102 to the left in Fig. 2, thereby limiting the movement of the table 66 in a direction away from the rolls 8 and 10. Movement of the table 66 to the right in Fig. 2 results in bringing the table 66 to a position of rest with the upper end of the links 100 contacting stops 108 rigidly secured to the machine frame, in which position the delivery end of the table 66 is closely adjacent to the rolls 8 and 10, as indicated in Figs. 3 and 4, in position to receive the work advancing through the rolls 8 and 10 or to direct the work to the rolls when the work is moving from left to right in Figs. 1 and 2. Table 52 is, as stated, similarly mounted so as to be movable toward and from the rolls 8 and 10. By having the tables 52 and 66 movable in the manner described, the work may be readily presented to and removed from the rolls 8 and 10 with little effort on the part of the operator and without displacing the work relatively to the tables after it has once been positioned in proper alinement with respect to the rolls 8 and 10.

In preparing a piece of work for presentation to the rolls 8 and 10, the piece of work, such as hide or skin 120 (Fig. 1), is placed upon a sheet 122 comprising a layer of resilient rubber-like material and then covered with a sheet 124 of similar material conveniently coextensive in area with respect to the sheet 122, both sheets 122 and 124 being of a size to support and cover pieces of work of the class intended to be treated in the particular machine, it being understood that the machine and the sheets 122, 124 will be built to suit the size of the work to be treated. It is obvious, of course, that pieces of work of any size smaller than the sheets 122 and 124 may be treated in the machine and that it would not be economically advantageous to build and use a large machine and large sheets 122, 124 for small work pieces.

The sheets 122, 124 are used over and over again in the treatment of pieces of work such as hides and skins. Hence, the sheets 122, 124 are to be regarded as movable parts of the machine. These sheets of resilient material are preferably also quite flexible, thus facilitating the introduction of the work between the sheets, it being necessary merely to lift the upper sheet 124 beginning at the left end thereof in Figs. 1 and 2 and fold it over on top of the upper roll 8 of the machine in order to remove a hide or skin which has been operated upon and to introduce a new hide or skin. Where the hide or skin is substantially smaller than the sheets 122, 124 the assembled piece of work and the sheets 122, 124 will be fed to a position where the hide or skin is free but where the sheets are not entirely out of the grip of the rolls 8 and 10. In other words, the sheets 122, 124 (but not the hide or skin) may at the end of an operation on a hide or skin, still be within the grip of the rolls 8 and 10. Hence, when the upper sheet 124 is thrown over on top of the upper roll 8 it does not become displaced with respect to the lower sheet 122. In this position of the assembled work piece and sheets, the hide or skin which has just been operated upon may be readily removed and a new hide or skin substituted therefor. This method of assembling the work and the sheets 122, 124 and of substituting new work pieces for those which have received treatment may render the use of movable tables unnecessary.

Preferably, the resilient sheets 122, 124 for use in the machine are made of a fabric 130 (Fig. 5) to which a substantial layer of rubber or rubber-like material 132 is attached on one side only of the fabric layer. It is to be understood, however, that the sheets may be of rubberized fabric 130 with layers 132 of rubber on both sides as shown in Fig. 6. Fig. 5 indicates displacement of the rubber or rubber composition or other similar resilient material under pressure of the rolls 8 and 10. In any case, the thickness of the sheets to be used is determined by proper tests, allowance being made for other factors such as the thickness and resistance to stretch of the hides or skins being operated upon, the diameter of the rolls 8 and 10, and the amount of pressure being applied through said rolls. In Fig. 5 of the drawings there are disclosed solid metal rolls 8 and 10 which are substantially ten inches in diameter and spaced one-half inch apart. The rubberized fabric sheets 122, 124 are each five-sixteenths of an inch in thickness, while the skin 120 between them is approximately one-sixteenth of an inch in thickness. It follows that the assembled sheets and skin are squeezed, at the narrowest place between the rolls 8 and 10 to the thickness of one-half inch from a combined thickness of eleven-sixteenths of an inch, a reduction of about 27%. Since resilient material, such as rubber or rubber composition, is substantially incompressible as to volume, it follows that the rubber or other resilient material must be displaced both to the right and to the left in Fig. 5 from the place of greatest compression which is located in and closely adjacent to a plane passing through the axes of the rolls 8 and 10. In the case of a resilient material of homogeneous composition, the greatest movement of displacement of material due to the described compression is in the middle or interior of the sheet of such material, with movement of material to a lesser degree along the surface in contact with the metal roll and along the surface in contact with the hide or skin. In those sheets or mats wherein a single layer of rubber-like resilient material is backed by a layer of fabric, as in Fig. 5, expansion of the rubber-like material in lateral directions from the seat of pressure will be greatest near to or at the free surface of the rubber material and thus cause a highly effective stretching of the skin in contact therewith. Some of the advantages of the preferred constructions of mats may be retained to a degree even if the fabric layer is unattached to the layer of resilient rubber-like material. Where the sheet of resilient material has a fabric layer in the center thereof such fabric layer restricts or prevents movement in the middle of the sheet and thus insures that the greater movement of resilient material will take place, under compressive force, near the surfaces of said sheet, that is, at the surface in contact with the metal roll and along the surface in contact with the hide or skin. Since the movement of the resilient material is in opposite directions from the place of greatest compression of the sheet material, and since the surfaces of the resilient sheets in contact with the hide or skin are friction surfaces, there are produced on the hide or skin, in areas closely adjacent to said place of greatest compression, stretching effects caused by the described movements of the resilient material. As the resilient sheets and the hide or skin assembled therewith move continuously through the plane of greatest compression, the stretching effect upon the hide or skin is, in effect, repeated continuously in highly localized areas until every part of the hide or skin has been stretched throughout the whole area thereof in directions at a right angle to a transverse line on the hide or skin coinciding with the plane of greatest compression. No matter how narrow we may conceive the strip of hide or skin substance undergoing stretching to be at any given instant, it is clear that the said strip is constantly shifting in the direction of feed and is constantly changing as to its boundaries and that such successive strips overlap each other and hence that the substance of the strips is, in effect, repeatedly operated upon in the stretching operations. The result is that the hide or skin throughout its whole area is subjected to almost an infinite number of stretching operations in a succession of highly localized overlapping areas thereof, with the result that the hide or skin has the constituent fibers thereof thoroughly worked in such stretching operations in a manner to soften and stretch the leather. As a matter of fact a piece of leather which has passed through this operation has a remarkably softer and plumper feel than the same piece of leather before the operation. The increase in area is not marked in some classes of skins, in others about 10%, so that the stretching is not excessive but is nevertheless effective to produce the described softening and plumping effect.

In view of the fact that no sharp edged tool comes in contact with the work, and particularly with the grain surface during treatment thereof, as in other softening operations upon hides and skins, it follows that pieces of work otherwise ready for the market may be subjected to this treatment without danger of damaging or even marring a highly polished or otherwise finished grain or flesh surface. It is to be understood that different classes of work, as determined by thickness of material, resistance to stretching, and differences in tannage in the case of hides and skins, will require different treatment according to this invention, in the sense that the thickness and consistency of the resilient sheets or mats and the frictional quality of their surfaces must be suited to the conditions imposed by the work and that, furthermore, the size of the metal rolls may be varied and the amount of compressive force also varied in accordance with the requirements as determined by suitable tests.

Due to the stretching and softening effects produced upon a hide or skin while the latter is being passed through the machine, a treating liquid applied to one or both surfaces thereof is readily worked into the substance of the hide or skin. For example, a hide or skin treated upon the flesh surface thereof with a suitable amount of a fat-liquoring solution and then passed through the machine will be found to have the fat-liquor worked into the substance thereof from the flesh surface without any injury to the finished grain surface. Conveniently, the fat-liquor is applied to the flesh surface by means of a spraying apparatus commonly employed in applying other liquid materials to the surfaces of hides or skins.

In the operation of the machine and in the practice of the method, a hide or skin is interposed between sheets comprising resilient material and substantially coextensive with respect to each other and, preferably, considerably larger than the hide or skin to undergo treatment. This assemblage of work piece and sheets is then presented by a movable table 52 or 66 to the rolls 8 and 10 which, by their rotation, feed the assembled work piece and sheets through the plane of compression provided by suitable adjustment of one roll with respect to the other. In other words, the same rolls which produce compressive effect upon the assembled work piece and sheets also operate to feed them progressively through the plane of compression. At the end of the travel of the work piece, the upper sheet or mat is laid back, the hide or skin removed, and a new one substituted therefor. Preferably the hide or skin will be positioned on the lower resilient sheet or mat with the backbone line thereof substantially parallel to the plane defined by the axes of the rolls 8 and 10. This is because the hide or skin will stretch more readily along lines at right angles to the backbone line of the hide or skin whereas, if the hide or skin be sent through with the backbone line thereof coinciding with the direction of feed of the work piece, the resistance to the stretching operation offered by portions of the work lying along the backbone line will restrict, to some extent, stretching of the normally more stretchable portions lying at either side of the said backbone portions. If desired, however, the hide or skin may be sent through two or more times with the backbone line of the hide or skin in different angular relationships to the plane passing through the axes of the rolls. In certain cases, particularly when a treating substance is applied to the flesh surface of a hide or skin, the latter is sent through the machine grain side up. In other cases it may be preferable to send the work through flesh side up. The speed at which the work is sent through the rolls 8 and 10 is a matter of real importance. Apparently the speed must be suited to the work, particularly in the case of leather. The firmer the leather, the more resistant it is to stretching forces, the more must it be given time to stretch under the action of the resilient rubber-like material. Hence, for the common run of chrome tanned skins, it is preferred to use a roll or rolls of large diameter (for example ten-inch) driven at relatively slow speed (for example, with the work traveling at twelve feet per minute). In general, the greater the pressure exerted by the rolls 8 and 10 the softer the hide or skin after a single treatment. It is to be noted, however, that if the pressure is too great, the hide or skin may be overstretched or actually ruptured or torn apart along lines extending transversely of the direction of feed.

Having described our invention, what we claim as new and desire to secure by Letters Patent of the United States is:

1. That improvement in methods of stretching substantially dry pieces of leather which comprises pressing a body of resilient material having a friction surface into firm contact with such a piece of leather, and displacing said resilient material in opposite directions in the plane thereof at and from the place of pressure thereby causing the frictional drag of the friction surface on the piece of leather to stretch the piece of leather in opposite directions from said place.

2. That improvement in methods of stretching and softening substantially dry pieces of leather which comprises pressing pieces of resilient material having each a friction surface into firm contact with directly opposite surfaces of such a piece of leather, and displacing said resilient material in opposite directions in the planes thereof at and from the place of pressure simultaneously on the two surfaces of the piece of leather thereby causing a frictional drag of the moving portions of the two pieces of resilient material on opposite sides of the piece of leather to stretch the piece of leather in opposite directions from said place of pressure.

3. That improvement in methods of stretching and softening substantially dry pieces of leather which comprises placing a flat body of resilient material having a friction surface in contact with such a piece of leather, and applying pressure to the resilient material and piece of leather over a relatively narrow area extending across the piece of leather, thereby stretching a narrow strip in the piece of leather in directions at a right angle to the long axis of said strip.

4. That improvement in methods of stretching and softening substantially dry pieces of leather which comprises placing such a piece of leather between sheets substantially coextensive therewith and each comprising a layer of resilient rubber-like material with said layer in contact with the leather, and subjecting the assembled piece of leather and resilient material to compressive operations in many localized overlapping areas, the compressive operations being carried on until all portions of the piece of leather have received treatment.

5. That improvement in methods of stretching hides, skins, leather, and other similar pieces of work which comprises placing a piece of work flat between flat sheets of resilient rubber-like material, subjecting the assembled sheets and flat piece of work to a compressive operation, and causing the seat of compression to travel over the flat piece of work at a relatively slow rate.

6. That improvement in methods of stretching hides, skins, leather, and other pieces of work which comprises subjecting a piece of work placed between flat sheets of resilient material to compressive operations applied locally to a series of areas in succession by opposed rolls rotated in opposite directions, the compressive operations being carried on until all portions of the piece of work have received treatment.

7. That improvement in methods of stretching and softening substantially dry pieces of leather which comprises placing such a piece of leather between flat sheets each having a layer of resilient rubber material with the latter in contact with the leather, subjecting the assembled sheets and flat piece of leather to compressive forces, and causing the seat of compression to travel continuously from one end of the piece of leather to the other.

8. That improvement in methods of stretching and softening substantially dry pieces of leather which comprises stretching such a piece of leather by exerting compressive forces upon the piece of leather through resilient material frictionally engaged with one or both surfaces of the piece of leather, and simultaneously causing expansion of the resilient material in opposite directions in a plane at a right angle to the direction of application of the compressive forces, said expansion of the resilient material being effective by reason of the frictional drag between it and the piece of leather to stretch the piece of leather.

9. In a machine for performing stretching operations upon hides, skins, leather, and other similar pieces of work, a work support comprising a layer of resilient material, a sheet-like member arranged to rest upon a piece of work on the support, said sheet-like member comprising a fabric layer and a layer of resilient material on one face only of the fabric layer, the resilient layer being arranged in contact with the work, and means to exert compression upon the work support, the piece of work and the sheet-like member to stretch the work in many localized overlapping areas, the compressive operations being carried on from one end of the piece of work to the other.

10. In a machine for stretching pieces of leather, a table, a work support member movable along upon the table, a member arranged to cover a piece of work on the work support, one of said members comprising a layer of resilient rubber-like material arranged in contact with the work, and means to compress the piece of work between the work support and cover members to effect stretching thereof.

11. In a machine for stretching pieces of leather, a table, a work support having a flat smooth surface and arranged to rest on the table, a member comprising a layer of resilient rubber-like material arranged to contact from above with a piece of work on the work support, and a pair of rolls arranged to exert progressively compression upon the work support, piece of work, and resilient member from one end of the piece of work to the other while the work support, piece of work and covering member are traveling between and past said rolls.

12. In a machine for stretching pieces of leather, a table, a work support having a flat smooth surface and arranged to rest upon the table, a member having a layer of rubber-like material and arranged to cover a piece of work upon the work support with the rubber-like layer in contact with the work, and means arranged to exert a compressive effect upon the assembled work support, piece of work and covering member, in a series of highly localized overlapping areas, the compressive operations being carried on until all portions of the piece of work have received treatment.

JOHN H. CONNOR.
MATTHEW M. MERRITT.